(12) United States Patent
Passarotto et al.

(10) Patent No.: US 7,393,063 B2
(45) Date of Patent: Jul. 1, 2008

(54) SPOKED WHEEL FOR A BICYCLE

(75) Inventors: Maurizio Passarotto, Rovigo (IT); Mario Meggiolan, Creazzo (Vicenza) (IT)

(73) Assignee: Campagnolo S.R.L., Vicenza (IT)

( * ) Notice: Subject to any disclaimer, the term of this patent is extended or adjusted under 35 U.S.C. 154(b) by 310 days.

(21) Appl. No.: 10/803,291

(22) Filed: Mar. 18, 2004

(65) Prior Publication Data

US 2006/0022513 A1      Feb. 2, 2006

(30) Foreign Application Priority Data

Mar. 18, 2003   (EP)   .................................. 03425166

(51) Int. Cl.
*B60B 1/02*   (2006.01)

(52) U.S. Cl. .............................. 301/55; 301/58; 301/59; 301/104

(58) Field of Classification Search .................... 301/55, 301/56, 58, 59, 104, 110.5
See application file for complete search history.

(56) References Cited

U.S. PATENT DOCUMENTS

| | | | | |
|---|---|---|---|---|
| 614,284 A | * | 11/1898 | Barnett | 301/56 |
| 1,642,207 A | * | 9/1927 | Jones | 301/59 |
| 1,701,843 A | * | 2/1929 | Ford | 219/107 |
| 1,836,818 A | * | 12/1931 | Sauzedde | 301/56 |
| 6,145,938 A | * | 11/2000 | Dietrich | 301/59 |
| 6,382,734 B1 | * | 5/2002 | Passarotto | 301/55 |
| 2002/0074853 A1 | | 6/2002 | Krampera | |

FOREIGN PATENT DOCUMENTS

| | | |
|---|---|---|
| EP | 0 039 021 | 11/1981 |
| EP | 1 201 458 A | 5/2002 |
| JP | 11-321201 | 11/1999 |

* cited by examiner

*Primary Examiner*—Russell D Stormer
(74) *Attorney, Agent, or Firm*—Volpe and Koenig P.C.

(57) ABSTRACT

A spoked wheel for a bicycle is described, having a hub, a rim, and a plurality of spokes, which connect the hub to the rim. The spokes are arranged in groups set at an angular distance from one another. At least two spokes of each group (R), viewed in the direction of the axis of the wheel, cross over one another.

39 Claims, 6 Drawing Sheets

SPOKED WHEEL FOR A BICYCLE

FIELD OF THE INVENTION

The present invention relates to a spoked wheel for a bicycle, particularly one that comprises a hub, a rim, and a plurality of spokes that connect the hub to the rim.

BACKGROUND

Recent studies and research have been aimed at identifying new configurations of spoked wheels for bicycles leading to better performances of the wheel, as well as creating an original and innovative aesthetic effect.

Technically speaking, research in the field of spoked wheels for road racing bicycles has been directed to identifying solutions that on the one hand reduce weight, which is increasingly desirable in road racing, and on the other hand increase the static and dynamic stability of the wheel. Structural strength, particularly as it results in a reduction in the risks of failure of the spokes of the wheel, is also desired.

In road racing wheels especially, the spokes make a substantial contribution to achievement of the desired results. In fact, the spokes contribute to maintaining static and dynamic stability of the wheel. Furthermore, in rear wheels, the spokes are responsible for performing the important function of transmitting the driving torque from the wheel hub to the rim of the wheel. The driving torque transmission should occur with the maximum possible efficiency, and with minimum deformations, so as to not dissipate the energy exerted on the pedals by a cyclist. Finally, the desired results should be achieved with the minimum weight possible and without introducing risk factors for failure of the wheel spokes. From this standpoint, a particularly critical factor is the tensioning of the spokes during wheel assembly. One of the purposes of said tensioning is to guarantee that the rim will always remain "centered" or "true", i.e., it will not shift away from a median plane of the wheel orthogonal to the axis of the hub and equidistant from the ends of the hub itself. Thus, the spokes of a typical spoked wheel include a first set of spokes on one side of the wheel, connected to a first hub portion, and a second set of spokes on the other side of the wheel, connected to a second hub portion, set at an axial distance from the first portion. Consequently, the spokes on the two sides of the wheel have an inclination or camber angle with respect to the median plane of the wheel. This inclination causes the spoke tensioning to give rise to components of force in the direction parallel to the axis of the wheel. Balancing in the components of force keeps the rim in the centered or true condition. Spoke tensioning is most critical in wheels where the spokes on the two sides of the wheel present different camber angles. This is typically the case for spokes of the rear wheel, where the wheel hub carries a sprocket cassette, where spokes set on that side have a considerably smaller inclination angle than the inclination angle of the spokes on the other side. Obviously, the spokes with smaller inclination angles must be tensioned more than the spokes on the other side in order to guarantee the centered position of the rim. Said higher tensioning gives rise to a greater risk of failure of the individual spoke. The problem of a different camber angle of the spokes on the two sides of the wheel exists not only for rear wheels. This problem exists in any wheel where that hub is partially utilized, for example, by the disk of a disk brake.

In order to solve the above mentioned problems, the applicant has already proposed and developed (see European patent application No. EP-A-1 201 458) a spoked wheel for a bicycle. The present invention sets forth another solution to the aforementioned problem.

SUMMARY

The present invention provides a spoked wheel comprising a hub having an x-axis defining the axis of the wheel, a rim and a plurality of spokes that connect the rim to the hub. The spokes are arranged in groups wherein at least two spokes of each group, when viewed in the x-axis of the wheel, cross over one another. Further advantageous characteristics of the spoked wheel according to the invention are specified below.

At the same time, as will clearly emerge from the appended drawings, the invention provides a new wheel arrangement with an innovative and technical solution and an original aesthetic appearance.

BRIEF DESCRIPTION OF THE DRAWINGS

Further characteristics and advantages of the invention will emerge from the following description with reference to the appended drawings, which are provided purely by way of non-limiting example and in which.

DETAILED DESCRIPTION OF THE PREFERRED EMBODIMENTS

Figure 1:
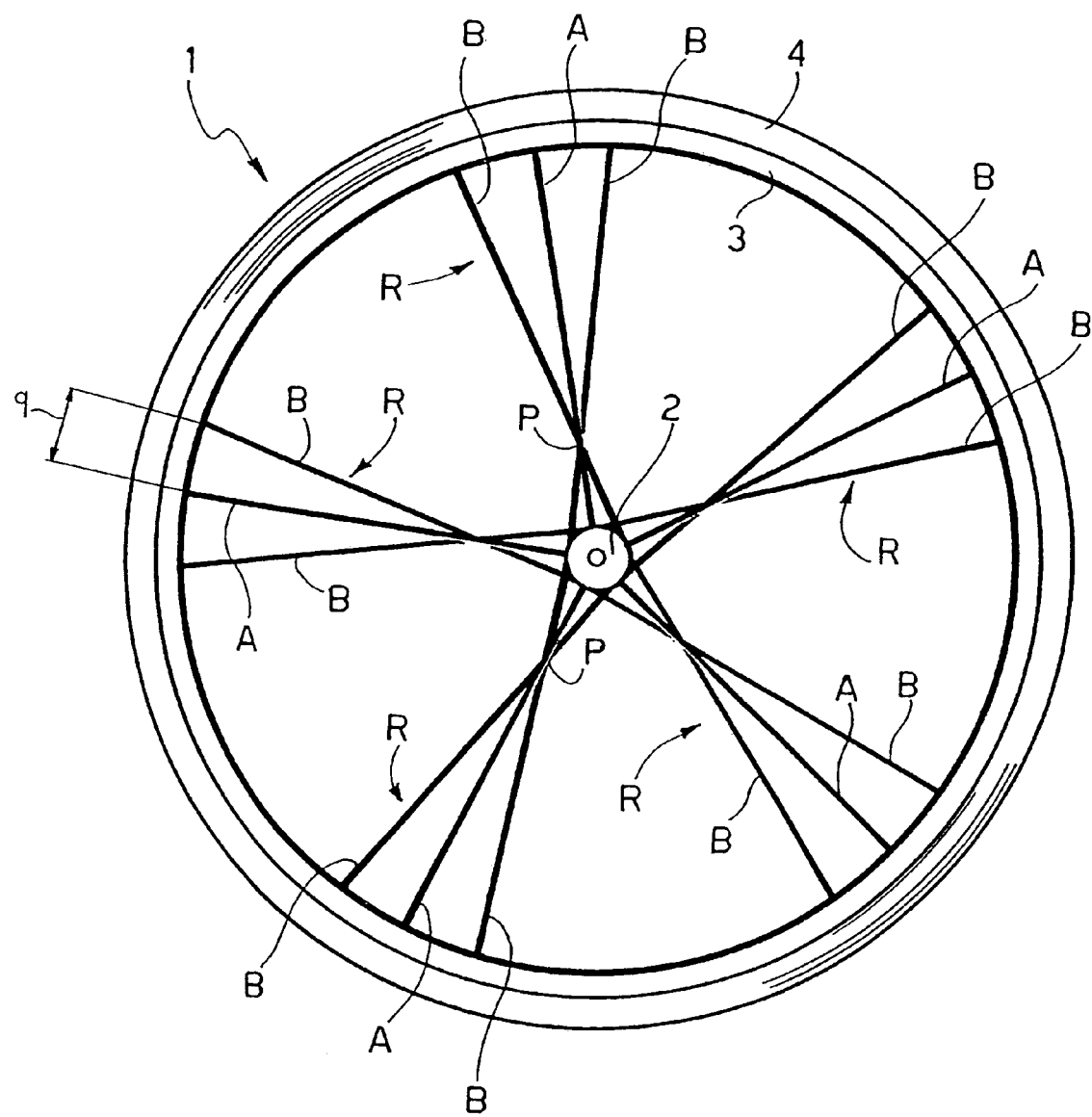
FIG. 1 illustrates a first embodiment of the wheel according to the invention, viewed in the direction of the axis of the wheel.
Figure 3:
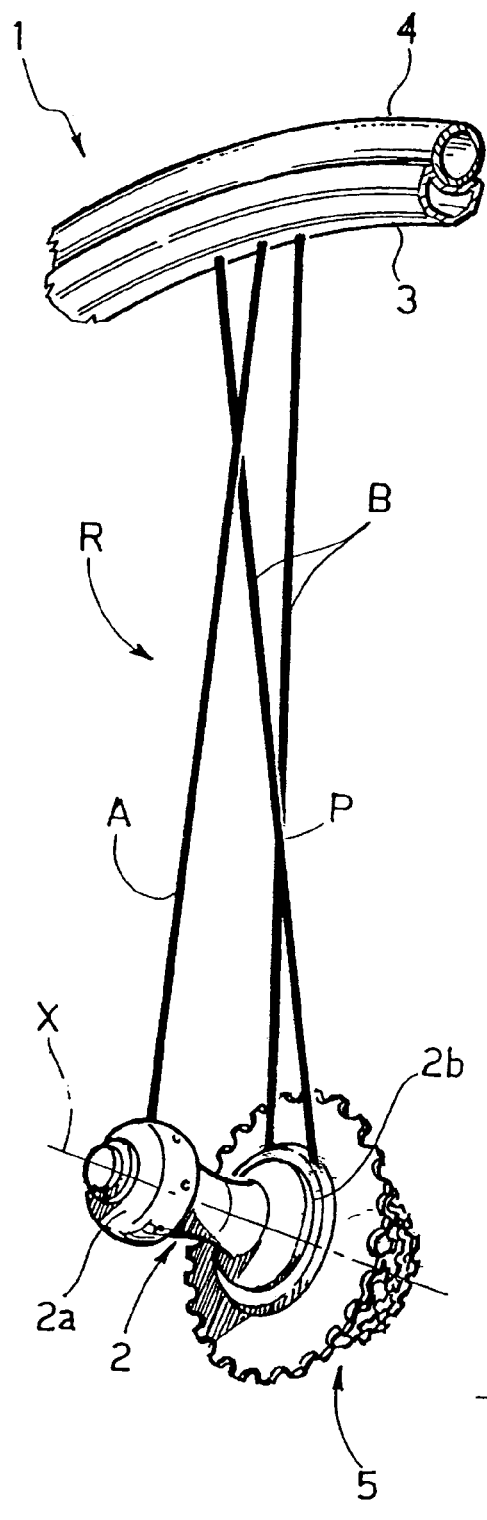
FIG. 3 is a perspective view of a detail of the wheel according to the invention, in use as a rear bicycle wheel.
Figure 4:
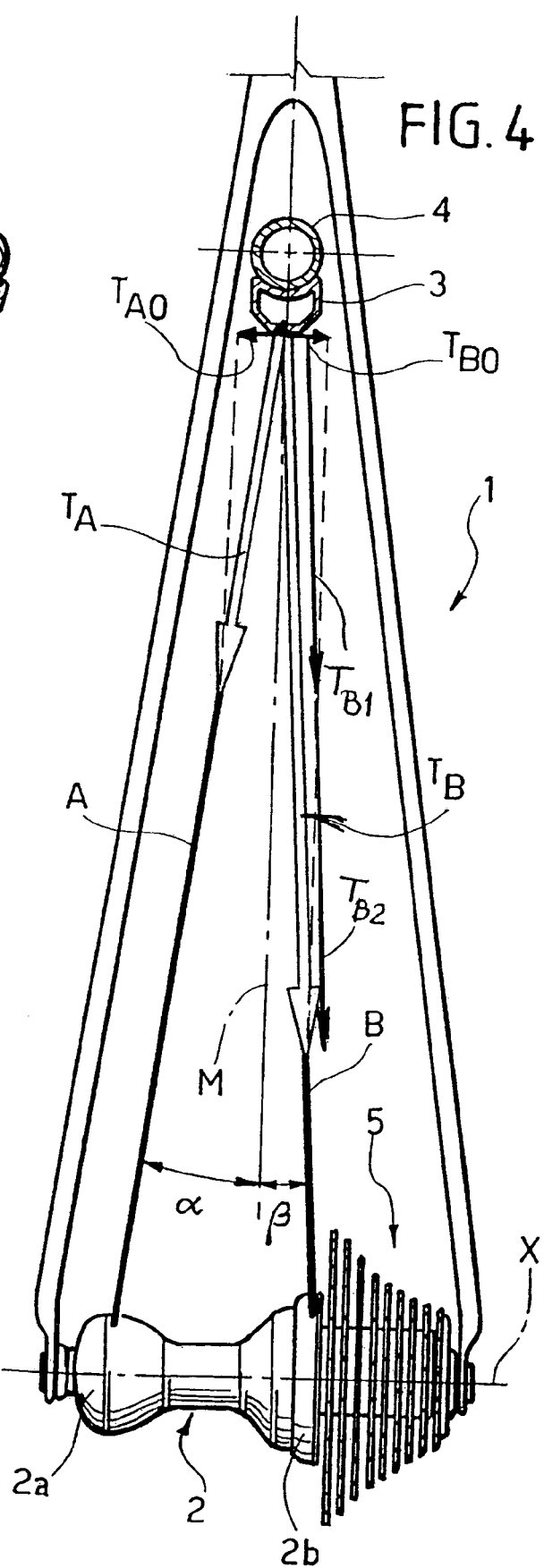
FIG. 4 illustrates a view of the wheel of FIG. 3, in a plane containing the axis of the wheel, in which the fork of the bicycle frame on which the wheel is mounted is also illustrated.

With reference to FIGS. 1, 3 and 4, the reference number 1 designates as a whole a bicycle wheel, which comprises a hub 2, a rim 3 on which a tire 4 can be mounted, and a plurality of spokes that connect the hub 2 to the rim 3.

The present description will not go into any detail of the structure and conformation of the hub 2 and of the rim 3, since these elements are known and the structure of these components, taken alone, does not fall within the scope of the present invention. Likewise, the mechanical fastening or physical way in which each spoke is connected to the rim 3 at one end, and to the hub 2 at the other end, is not illustrated in detail. Any known technique suitable for this purpose can be used. The elimination of said constructional details from the drawings therefore makes the latter easier and faster to understand the invention.

FIGS. 3 and 4 refer to the use of the invention with a rear bicycle wheel, in which a sprocket cassette 5 is associated with the hub 2. The cassette 5 comprises a plurality of sprockets designed to selectively engage a drive chain of the bicycle in a conventional way As will be clarified below, a spoked wheel presenting the geometry illustrated in FIG. 1 may be applied both as a rear wheel, see FIGS. 3 and 4, and as a front wheel, see FIG. 5.

The spokes that connect the hub to the rim of the wheel according to the invention are arranged in a plurality of groups R, see FIG. 3. In the present description, by "group of spokes R" is to be meant a plurality of spokes A and/or B grouped together in such a way that the maximum distance (or chord) on the rim 3 between two adjacent spokes of the group is less than the distance (or chord) on the rim 3 between two different groups. In the case where all the spokes of the group R are set at equal distances apart from one another by a pitch q, the distance (or chord) on the rim 3 between two R groups is greater than said pitch q. In the case of the solution illustrated in FIGS. 1 to 5, each spokes group R is made up of a set of three spokes. As may be clearly seen from FIG. 3, in each group of three spokes R one spoke A is visible, which is connected to one end 2a of the hub 2, and a couple of spokes B are connected to the second portion 2b of the hub 2 which is adjacent to the sprocket cassette 5 and set at an axial distance, along X, from the end 2a.

Once again in the case of the illustrated preferred embodiment, spoke A, viewed in the direction of the axis of the wheel, i.e., as it may be seen in FIG. 1, is set in a radial direction, lying in a radial plane containing the x-axis of the wheel.

Spokes B, are instead arranged in such a way that they cross over one another. Once again with reference to the preferred embodiment, since the spokes are oriented, when viewed as in FIG. 1, in a specular manner, i.e., with angles of inclination that are equal and opposite with respect to spoke A, they cross over one another at a point P (again as viewed in FIG. 1), which lies on the central spoke A.

Spokes B are arranged in such a way that they cross over one another at a point P, as viewed in FIG. 3.

Of course, it is possible that spokes B will present different inclinations and will therefore cross over spoke A, at different points. It is also possible that spoke A will not be centered on the rim 3 between spokes B. Therefore spokes B will have different distances (or chords) q on the rim 3. Finally, it is also possible that only two spokes of each set of three spokes R will cross over one another.

In the case of a rear wheel, the sets of three spokes in group R are all oriented so as to have the two spokes B on the side of the hub 2 on which the sprocket cassette 5 is located, and the spoke A on the opposite side of the wheel. Consequently, the wheel according to the invention, if used as a rear wheel, comes to have twice as many spokes B on the sprockets side as the spokes on the opposite side A.

This arrangement leads to important advantages from the point of view of the structural strength of the wheel and in particular of the resistance to failure of the spokes, for the reasons discussed below.

In use with a rear wheel, see FIG. 4, the presence of the sprocket cassette 5 at one end of the hub 2 indicates that the spokes B set on that side of the hub will have an inclination β with respect to the median plane M of the wheel that is considerably smaller than the inclination α with respect to the median plane M of the spokes A. The median plane M is defined as the plane orthogonal to the x-axis of the hub that is substantially equidistant from the ends of the hub 2.

By convention, each spoke of the spoked wheel is mounted and applied with a given tensile force. In FIG. 4, $T_A$ and $T_B$ designate the components of tensile forces applied to the spokes of each set of three spokes. $T_A$ is the force which spoke A exerts on the rim 3. $T_B$ is the force resulting from the sum of the forces $T_{B1} + T_{B2}$ that spokes B, see FIG. 3, exert altogether on the rim 3. $T_{B1}$ and $T_{B2}$ are generally equal to one another, but may be different. The components of the two forces ($T_A$, $T_B$) in a direction parallel to the x-axis of the wheel are generally designated by $T_{AO}$ and $T_{BO}$ in FIG. 4.

In the wheel according to the invention, the horizontal components $T_{AO}$ and $T_{BO}$ are in balance with one another, so as to keep the rim 3 in the vertical plane M. As a result of its smaller inclination, resultant $T_B$ must be greater than $T_A$. To be precise, the ratio between the tensile force $T_A$ of the single spoke A and the tensile force $T_B$, which is the sum of the two tensile forces of spokes B, $T_{B1}$ and $T_{B2}$ (of course always considering the tensile forces in the plane of FIG. 4) is equal and opposite to the ratio of the sines of the angles of inclination α and β. This condition applies, in general, to each set of spokes and applies, as a whole, to the total tensile forces of the spokes on either side of the vertical plane M.

In view of the above, it is evident that the spoke arrangement of the preferred embodiment leads to important advantages. First of all, since the tensile force $T_B$ is the resultant of the tensile forces of two spokes ($T_{B1}$ and $T_{B2}$), the tensile force of each spoke B is substantially one half of $T_B$. Consequently, this means that each spoke B may present a tensioning that is approximately halved with respect to that of a conventional wheel with a single spoke B.

Furthermore, it is important to note that in the case of a typical rear wheel, the ratio between the sine of β and the sine of α is approximately 1:2. Therefore, in the rim's balanced condition, $T_B$ is approximately twice $T_A$. Thus, each spoke B may be tensioned with a tensile force that is considerably less than that required if there were one single spoke which would substantially equal the tensile force of spoke A. The invention therefore provides that when the components of the tensile forces of the spokes in radial planes containing the axis of the wheel are considered, all spokes come to have tensile forces that are substantially equal to one another.

Of course, the balance condition of the tensile forces of the spokes of each set of three spokes exists also in a plane orthogonal to the x-axis of the wheel, i.e., in a plane like the one illustrated in FIG. 4. In this plane, the components of the tensile forces of the spokes B of each set of three spokes R in a tangential direction orthogonal to the rim are substantially balanced with respect to one another.

Furthermore, even though the invention provides the particular advantages discussed above in the case of a wheel with spokes having different camber angles on the two sides (as, for instance, in the case of a rear wheel of the type described, because of the presence of the sprocket cassette; or of any wheel, whether a front or a rear wheel, because of the presence, for instance, of the disk of a disk brake, the invention may in any case also be applied to a wheel with spokes having equal camber angles on the two sides (typically a front wheel).

Meanwhile, the configuration described above gives the wheel, whether a front or a rear wheel, when viewed in the direction of its axis (see FIG. 1), an innovative aesthetic appearance, which is original and altogether distinct.

Figure 2:
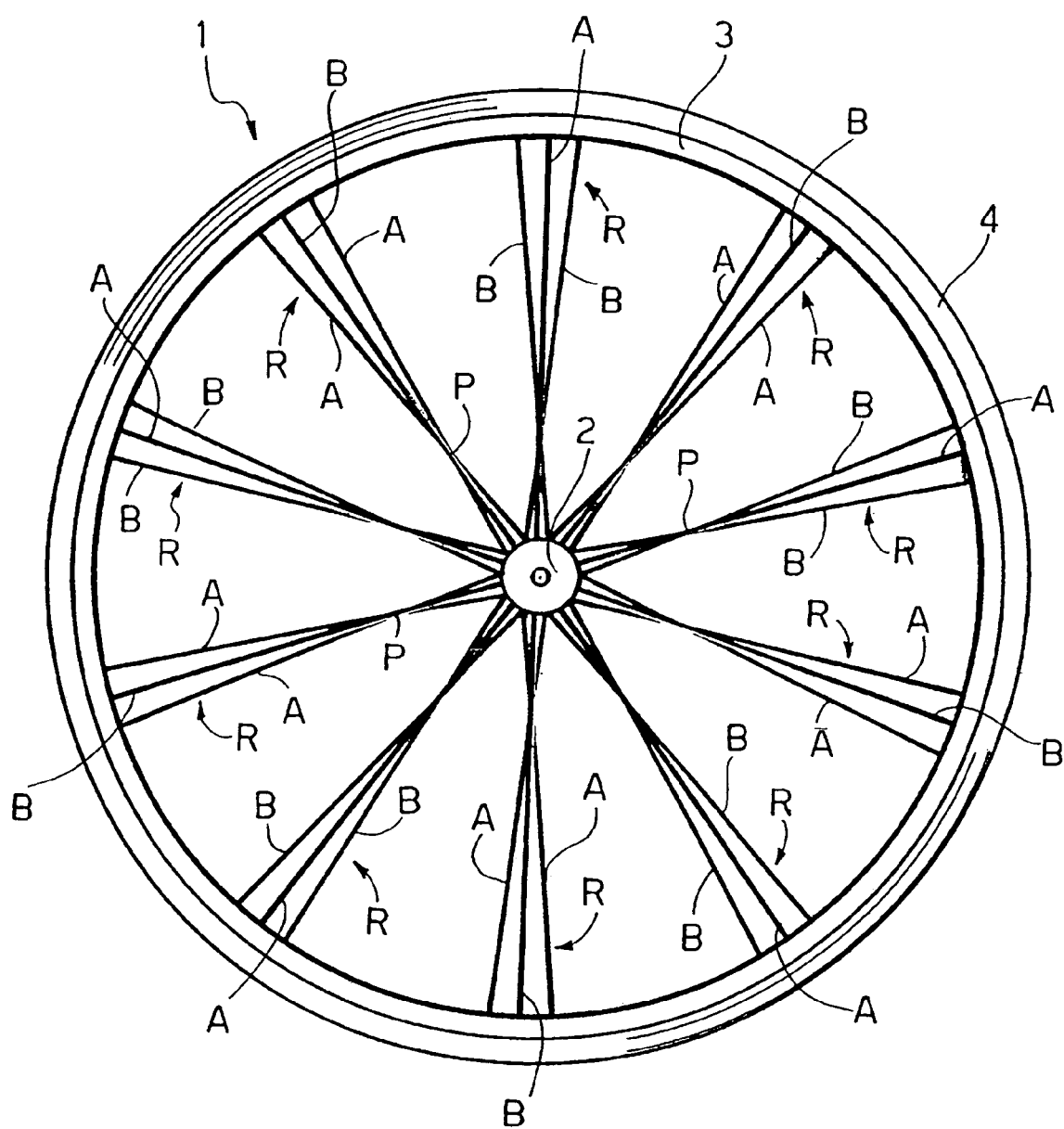
FIG. 2 illustrates an alternate embodiment of the wheel of FIG. 1.

FIG. 2 illustrates an alternate embodiment that compares ten three-spoke sets rather than five, as shown in FIG. 1. Obviously, however, the number of three-spoke sets may be varied at will.

Figure 5:
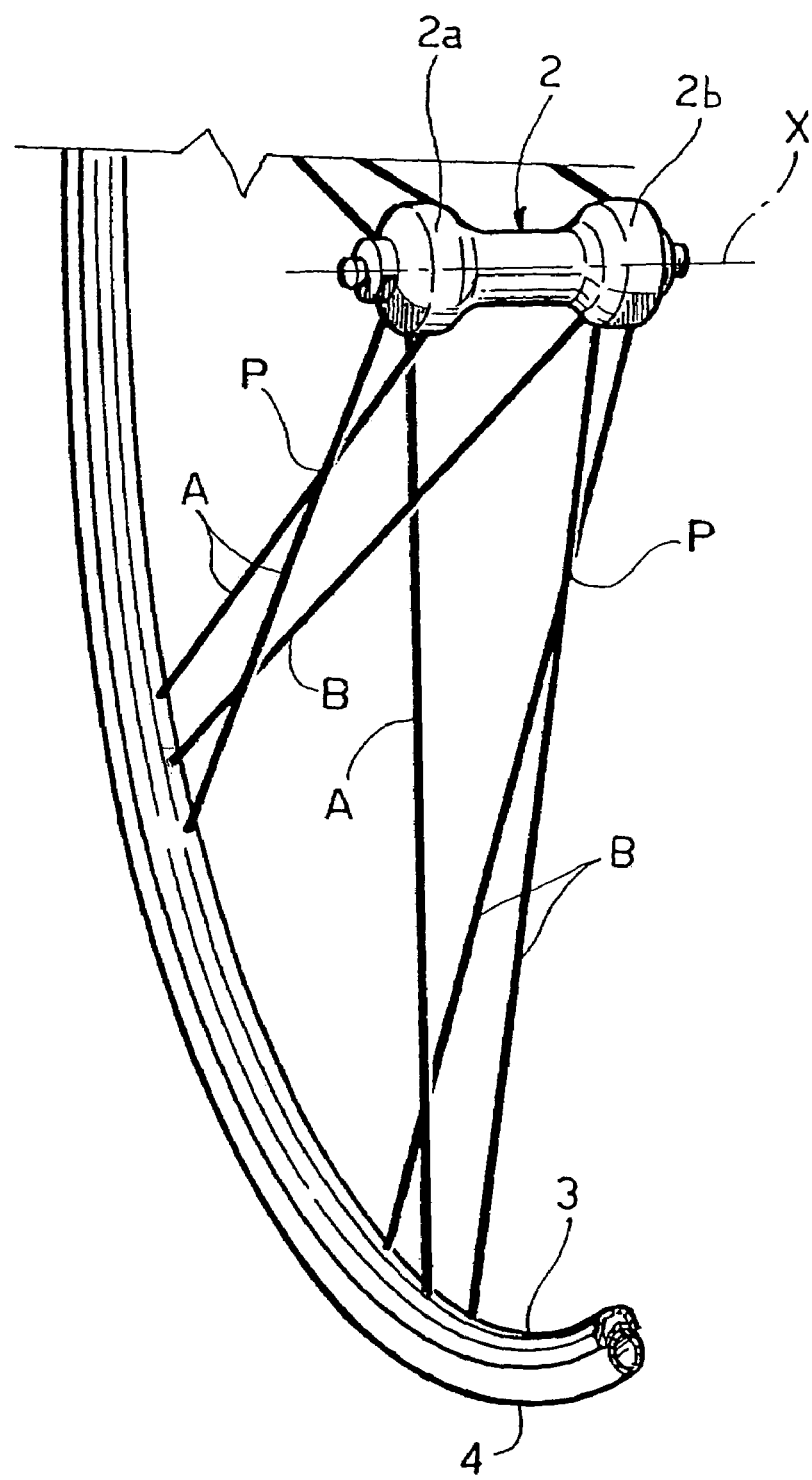
FIG. 5 is a partial perspective view of a wheel according to the invention, in use as a front wheel.

FIG. 5 illustrates a further alternate embodiment in which the wheel according to the invention is used as a front wheel. In this case, the three-spoke sets basically have the same configuration as the one illustrated in FIG. 1, if viewed in the direction of the axis of the wheel. However, the three-spoke sets are alternately oriented with their central spoke connected once (A) on one side (2a) of the hub 2 and once (B) on the other side (2b). Likewise, the double spokes are connected once (B) on one side (2b) of the hub 2 and once (A) on the other side (2a) of the hub. Said three-spoke sets are, moreover, preferably even in number in such a way that the front wheel will have an identical number of spokes on either side. In this regard, the wheel illustrated in FIG. 2 represents a front wheel with the three-spoke sets alternately oriented in the way described, so as to have 15 spokes on each side. It could also be a rear wheel, with 10 spokes A arranged all on one side of the wheel, and 20 spokes B arranged on the other side.

Figure 6:
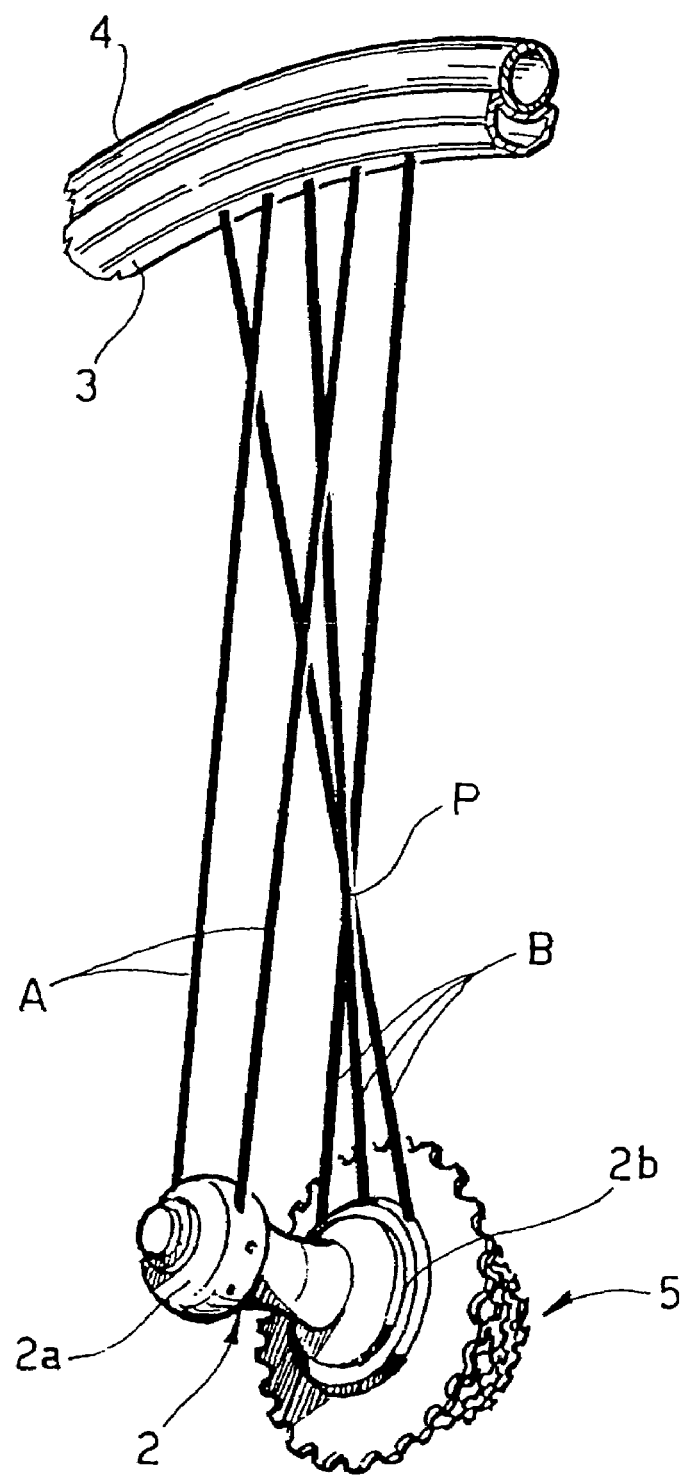
FIG. 6 is an alternate embodiment of the wheel of FIG. 3, wherein the spokes of the wheel are arranged in groups which are set at a distance apart from one another, each group being made up of five spokes, instead of three spokes as in the solutions illustrated in the previous figures.
Figure 7:
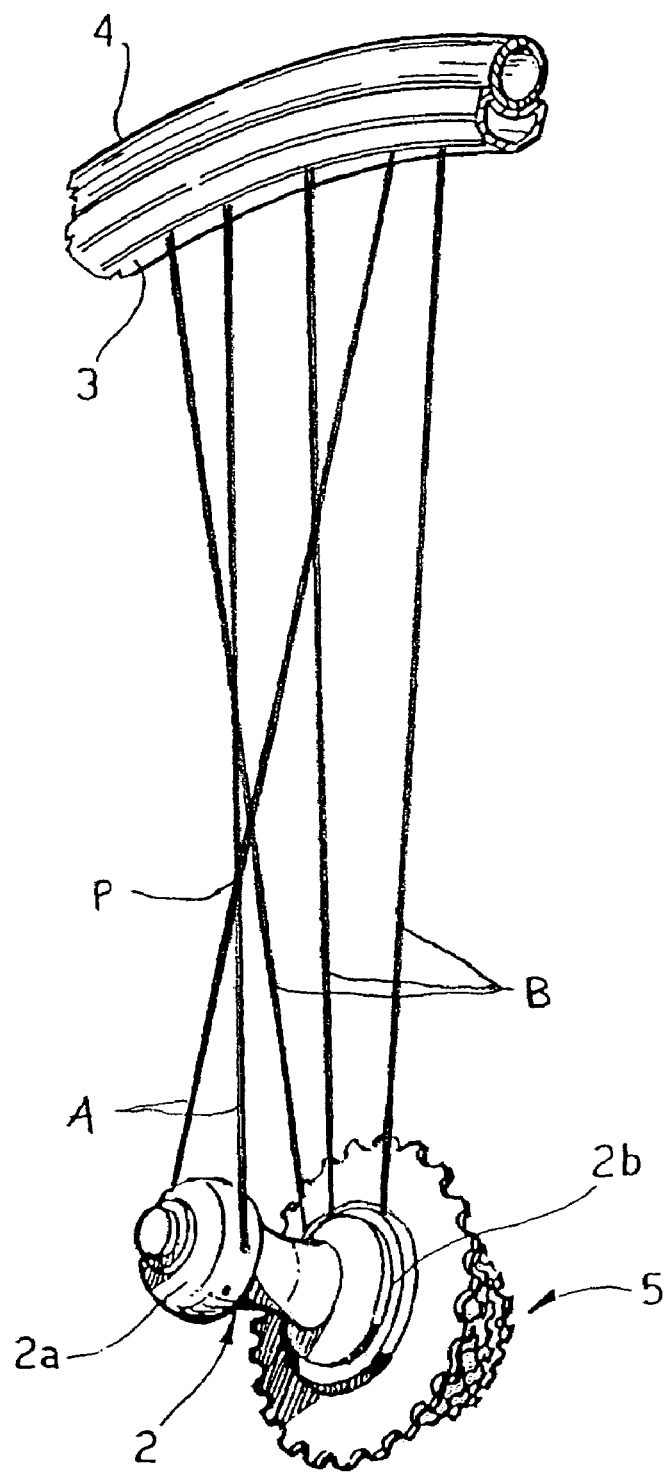
FIG. 7 is a further alternate embodiment of the wheel of FIG. 3, wherein the spokes of the wheel are arranged in groups which are set at a distance apart from one another, each group being made up of five spokes, instead of three spokes as in the solutions illustrated in the previous figures.

FIG. 6 illustrates a further example of application of the concepts of the present invention. This figure is a variant of FIG. 3 and illustrates an embodiment where each group R of spokes is made up of five spokes. Within each five-spoke set, two spokes A are connected to end 2a of the hub and are set substantially parallel to one another, whereas three spokes B are connected to the portion 2b of the hub and cross over one another at a point P. Regarding the number of the spokes making up each group of spokes, there is large freedom of choice for the designer. In addition, it would also be possible to foresee a solution like the one illustrated in FIG. 7, where the two spokes A are set crossing over one another, or a solution in which the spokes A cross over one another and the spokes B are set substantially parallel to one another.

All the considerations above developed with reference to balancing of the spoke's tensile forces obviously apply also in the latter case. In the case of a wheel with different camber angles on the two sides, the number of spokes that make up each group of spokes may be chosen in such a way as to obtain a tensioning of all the spokes of the wheel that is substantially uniform. For instance, a similar result could be achieved with a solution of the type illustrated in FIG. 6, should the ratio between the sines of the two camber angles be close to 3:2. To follow this criterion, each group of spokes can be made up of a number of spokes m on one side of the wheel and of a number of spokes n on the other side of the wheel which are in a ratio of m/n as close as possible to the inverse ratio of the sines of the camber angles of the respective two sides of the wheel. In addition, since the numbers m and n of spokes must be integers, perfect balancing of the tensile forces in each group of spokes may be obtained by varying the tension of each individual spoke. However, it is evident that also in this case the tensile forces of the individual spokes are far more homogeneous with respect to one another than in the case of known wheels, which have an equal number of spokes for both the camber angles.

In general, any other criterion regarding the number of spokes chosen in each group is not excluded. Nor it is excluded in the case of groups of spokes different from one another (also as regards number of spokes in each group) in the same wheel.

What is claimed is:

1. A spoked bicycle wheel, comprising a hub, having an axis (X) defining the wheel's axis, a rim and a plurality of spokes, that connect the hub to the rim, wherein said spokes are arranged in groups of three, each group of spokes comprises one or more spokes (A) connected to a first hub portion and one or more spokes (B) connected to a second hub portion that are set at an axial distance apart from said first hub portion, the groups are arranged such that the maximum distance on the rim between the spokes of a group is less than the distance on the rim between the outside spoke of the group and the next spoke that is not part of the group and wherein at least two spokes of each group, connected to the same hub portion, cross over one another when viewed in the direction of the axis (X) of the wheel.

2. The spoked wheel of claim 1, wherein in each group of spokes, the spokes (A) connected to the first hub portion differ in number from the spokes (B) connected to the second hub portion.

3. The spoked wheel of claim 1, wherein spokes connected to different hub portions cross over one another.

4. The spoked wheel of claim 1, wherein the spokes crossing over one another are adjacent one another on the hub.

5. The spoked wheel of claim 1, wherein the spokes of each group of spokes, viewed in the direction of the wheel's axis, have an arrangement that is specular with respect to a radial plane of symmetry.

6. The spoked wheel of claim 1 wherein tensile forces of the spokes of each group are substantially balanced with one another in the direction of the wheel's axis.

7. The spoked wheel of claim 1 wherein tensile forces of the spokes of each group are substantially balanced with one another in a direction tangential with respect to the center of the wheel and contained in a plane orthogonal to the wheel's axis.

8. The spoked wheel of claim 1 wherein the groups of spokes on the rim are set at equal distances apart from one another.

9. The spoked wheel of claim 1, wherein in each group of three spokes, one spoke is connected to a first hub portion and the other two spokes are connected to a second hub portion, set at an axial distance apart from said first hub portion.

10. The spoked wheel of claim 9, wherein the two spokes connected to the second hub portion, when viewed in the direction of the wheel's axis, cross over one another.

11. The spoked wheel of claim 10, wherein the two spokes connected to the second hub portion, when viewed in the direction of the wheel's axis, are set symmetrically with respect to a radial plane passing through the wheel's axis.

12. The spoked wheel of claim 10, wherein the spoke connected to the first hub portion extends in a radial plane containing the wheel's axis.

13. The spoked wheel of claim 12, wherein the three spokes of each group cross over one another all substantially at the same radial point, when viewed in the direction of the wheel's axis.

14. The spoked wheel of claim 13, wherein the radial point of crossing-over of the spokes of each group of three spokes is closer to the hub than to the rim.

15. The spoked wheel of claim 12, wherein tensile forces of the spokes of each group of three spokes are substantially balanced with one another in the direction of the wheel's axis.

16. The spoked wheel of claim 12, wherein tensile forces of the spokes of each group of three spokes are substantially balanced with one another in a direction tangential with respect to the center of the wheel and contained in a plane orthogonal to the wheel's axis.

17. The spoked wheel of claim 12, wherein the spoke connected to the first hub portion and the two remaining spokes of each group of three spokes present different angles of inclination with respect to a median plane of the wheel.

18. The spoked wheel of claim 17, wherein tensile forces of the spokes of each group of three spokes have components in the direction of the axis of the wheel and are substantially balanced with one another.

19. The spoked wheel of claim 17, wherein tensile forces of the spokes of each group of three spokes have components in a direction tangential with respect to the center of the wheel and contained in a plane perpendicular to the axis of the wheel and are substantially balanced with one another.

20. The spoked wheel of claim 17, wherein the tensile forces of the two spokes of each group of three spokes connected to the second hub portion are substantially equal to one another.

21. The spoked wheel of claim 17, wherein the sum of tensile forces of the two spokes connected to the second hub portion and tensile force of the spoke connected to the first hub portion have their tensile force components in a plane containing the axis of the wheel, and wherein the components are in a ratio with respect to one another that is substantially equal and inverse to the ratio of the sines of respective angles of inclination with respect to said plane median.

22. The spoked wheel of claim 12, wherein the wheel is a rear bicycle wheel and wherein the spokes are oriented with all of the radially extending spokes on the same hub portion, so that one hub portion has twice the number of spokes than the other hub portion.

23. The spoked wheel of claim 22, wherein the hub portion with twice the number of spokes than the other is the hub portion corresponding to the end of the hub which accepts a sprocket cassette.

24. The spoked wheel of claim 1, wherein the spokes connected to said first hub portion and to said second hub portion comprise tensile forces and have different camber angles ($\alpha$, $\beta$) and wherein each group of spokes has a number (m) of spokes connected to said first hub portion and a number (n) of spokes connected to said second hub portion such that the ratio (m/n) substantially approximates the inverse ratio ($\sin \beta / \sin \alpha$) of the sines of the respective camber angles.

25. The spoked wheel of claim 24, wherein the sum of tensile forces of the spokes of the wheel connected to said first hub portion and the sum of tensile forces of the spokes connected to said second hub portion are balanced with one another in the direction of the axis of the wheel.

26. A spoked wheel for a bicycle having an axis and comprising a hub having a first portion and a second portion, a rim, and a plurality of spokes connecting said hub to said rim, wherein the plurality of spokes are arranged in groups comprising an odd number of spokes having a center spoke that extends radially from the hub, at least two of the other spokes cross over one another when viewed in the direction of the wheel's axis and are adjacent to one another on the hub, and wherein the maximum distance on the rim between the spokes of a group is less than the distance on the rim between the outside spoke of the group and the next spoke that is not part of the group.

27. The spoked wheel of claim 26, wherein the maximum distance on the rim between 2 adjacent spokes is less than the distance on the rim between two different groups.

28. The spoked wheel of claim 26, wherein at least two spokes connect the first hub portion to the rim and at least one spoke connects the second hub portion to the rim, said at least one spoke extending radially from said second hub portion.

29. The spoked wheel of claim 26, wherein one hub portion comprises the same number of spokes as the other hub portion.

30. The spoked wheel of claim 26, wherein one hub portion comprises twice as many spokes as the other hub portion.

31. The spoked wheel of claim 30, wherein the hub portion comprising twice as many spokes as the other hub portion further comprises a sprocket cassette.

32. A rear bicycle wheel comprising:
a hub having an axis (X) and a median plane (M) generally perpendicular to the axis (X);
a rim; and
a plurality of spokes, arranged in groups of three (R), connecting the hub to the rim,
wherein the maximum distance on the rim between two adjacent spokes of a group is less than the distance on the rim between two different groups and each group of spokes has at least two spokes that define a crossover (P) on a first side of the median plane and at least one spoke on a second side of the median plane and the spokes on each side of the median plane produce generally equal forces in opposite directions along the axis (X) that maintain the rim centered about the median plane, two spokes of the group (R) are connected to a hub portion on the first side of the median plane and the other spoke is connected to a hub portion on the second side of the median plane, said hub portions set at an axial distance apart, the spokes are oriented with all of the radially extending spokes on the same hub portion, so that one hub portion has twice the number of spokes than the other hub portion, the hub portion with twice the number of spokes than the other is the hub portion corresponding to the end of the hub which accepts a sprocket cassette.

33. The spoked wheel of claim 32, wherein each group (R) of spokes comprises one or more spokes (A) connected to a first hub portion and one or more spokes (B) connected to a second hub portion that are set at an axial distance apart from said first hub portion.

34. The spoked wheel of claim 33, wherein in each group of spokes, the spokes (A) connected to the first hub portion differ in number from the spokes (B) connected to the second hub portion.

35. The spoked wheel of claim 32, wherein the spokes of each group of spokes, viewed in the direction of the wheel's axis, have an arrangement that is specular with respect to a radial plane of symmetry.

36. The spoked wheel of claim 35, wherein in each group of spokes, the spokes connected to at least one of the two hub portions are odd in number and include a spoke which, when viewed in the direction of the wheel's axis, is set at the center of the group, in said radial plane of symmetry.

37. The spoked wheel of claim 32, wherein the spoke on the second side of the median plane extends radially from the hub to the rim when viewed in the direction of the wheel's axis.

38. The spoked wheel of claim 32, wherein tensile forces of the spokes of each group of three spokes have components in the direction of the axis of the wheel and are substantially balanced with one another.

39. The spoked wheel of claim 32, wherein the sum of tensile forces of the two spokes connected to the hub portion on the first side of the median plane and tensile force of the spoke connected to the hub portion on the second side of the median plane have their tensile force components in a plane containing the axis of the wheel, and wherein the components are in a ratio with respect to one another that is substantially equal and inverse to the ratio of the sines of respective angles of inclination with respect to said plane median.

* * * * *